United States Patent
Marumoto et al.

(10) Patent No.: US 9,085,185 B2
(45) Date of Patent: Jul. 21, 2015

(54) INK JET PRINTING APPARATUS AND INK JET PRINTING METHOD

(71) Applicant: CANON KABUSHIKI KAISHA, Tokyo (JP)

(72) Inventors: Yoshitomo Marumoto, Yokohama (JP); Hiromitsu Yamaguchi, Yokohama (JP); Ryota Kato, Yokohama (JP); Hitoshi Tsuboi, Kawasaki (JP); Yohei Masada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/609,623

(22) Filed: Jan. 30, 2015

(65) Prior Publication Data

US 2015/0145909 A1 May 28, 2015

Related U.S. Application Data

(62) Division of application No. 13/270,707, filed on Oct. 11, 2011.

(30) Foreign Application Priority Data

Oct. 15, 2010 (JP) ................ 2010-232707

(51) Int. Cl.
*B41J 2/205* (2006.01)
*B41J 25/00* (2006.01)
*B41J 2/045* (2006.01)

(52) U.S. Cl.
CPC ............ *B41J 25/001* (2013.01); *B41J 2/04501* (2013.01)

(58) Field of Classification Search
None
See application file for complete search history.

(56) References Cited

U.S. PATENT DOCUMENTS

| | | | |
|---|---|---|---|
| 4,864,328 | A | 9/1989 | Fischbeck |
| 5,708,463 | A | 1/1998 | Hirabayashi et al. |
| 5,745,135 | A | 4/1998 | Hirabayashi et al. |
| 6,227,649 | B1 | 5/2001 | Hirabayashi et al. |

(Continued)

FOREIGN PATENT DOCUMENTS

DE    68919839 T2    7/1995

(Continued)

OTHER PUBLICATIONS

German Office Action issued in counterpart application No. 102011115981.2 dated May 13, 2013, along with its English-language translation—19 pages.

*Primary Examiner* — Geoffrey Mruk
*Assistant Examiner* — Bradley Thies
(74) *Attorney, Agent, or Firm* — Fitzpatrick, Cella, Harper & Scinto

(57) ABSTRACT

A printing apparatus that includes nozzle arrays, formed of nozzles for ejecting ink of the first to fourth ink color groups, and that scans a print medium while moving the nozzle arrays to perform printing. For printing a unit area of a print medium, where printing is to be completed by performing a plurality of scans, the printing apparatus performs a plurality of scans, and conveys, between movements, a print medium a predetermined amount, which is equivalent to the width of the unit area. Then, to perform a plurality of scans using the nozzle arrays for the first to fourth ink color groups, print data are generated, so that for the nozzle arrays that belong to two ink color groups, the nozzle array for the first ink color group is employed to eject ink into the unit area prior to the nozzle array for the second ink color group.

9 Claims, 16 Drawing Sheets

(56) References Cited

U.S. PATENT DOCUMENTS

| | | |
|---|---|---|
| 6,527,364 B2 | 3/2003 | Takahashi et al. |
| 7,699,436 B2 | 4/2010 | Shibata et al. |
| 8,310,702 B2 | 11/2012 | Imai |
| 2007/0216724 A1 | 9/2007 | Shibata et al. |
| 2008/0158281 A1 | 7/2008 | Saito |
| 2009/0231617 A1 | 9/2009 | Imai |
| 2012/0044287 A1 | 2/2012 | Yamaguchi et al. |
| 2012/0194614 A1 | 8/2012 | Marumoto |
| 2013/0038653 A1 | 2/2013 | Imai |

FOREIGN PATENT DOCUMENTS

| | | |
|---|---|---|
| DE | 69033566 T2 | 2/2001 |
| DE | 69710277 T2 | 10/2002 |
| EP | 0402426 B1 | 12/1994 |
| EP | 0665111 A2 | 8/1995 |
| EP | 0829368 A2 | 3/1998 |
| JP | 2000-135782 A | 5/2000 |
| JP | 2005-231060 | 9/2005 |
| JP | 2008-162094 | 7/2008 |
| JP | 2009-220451 A | 10/2009 |
| JP | 2009-279818 A | 12/2009 |

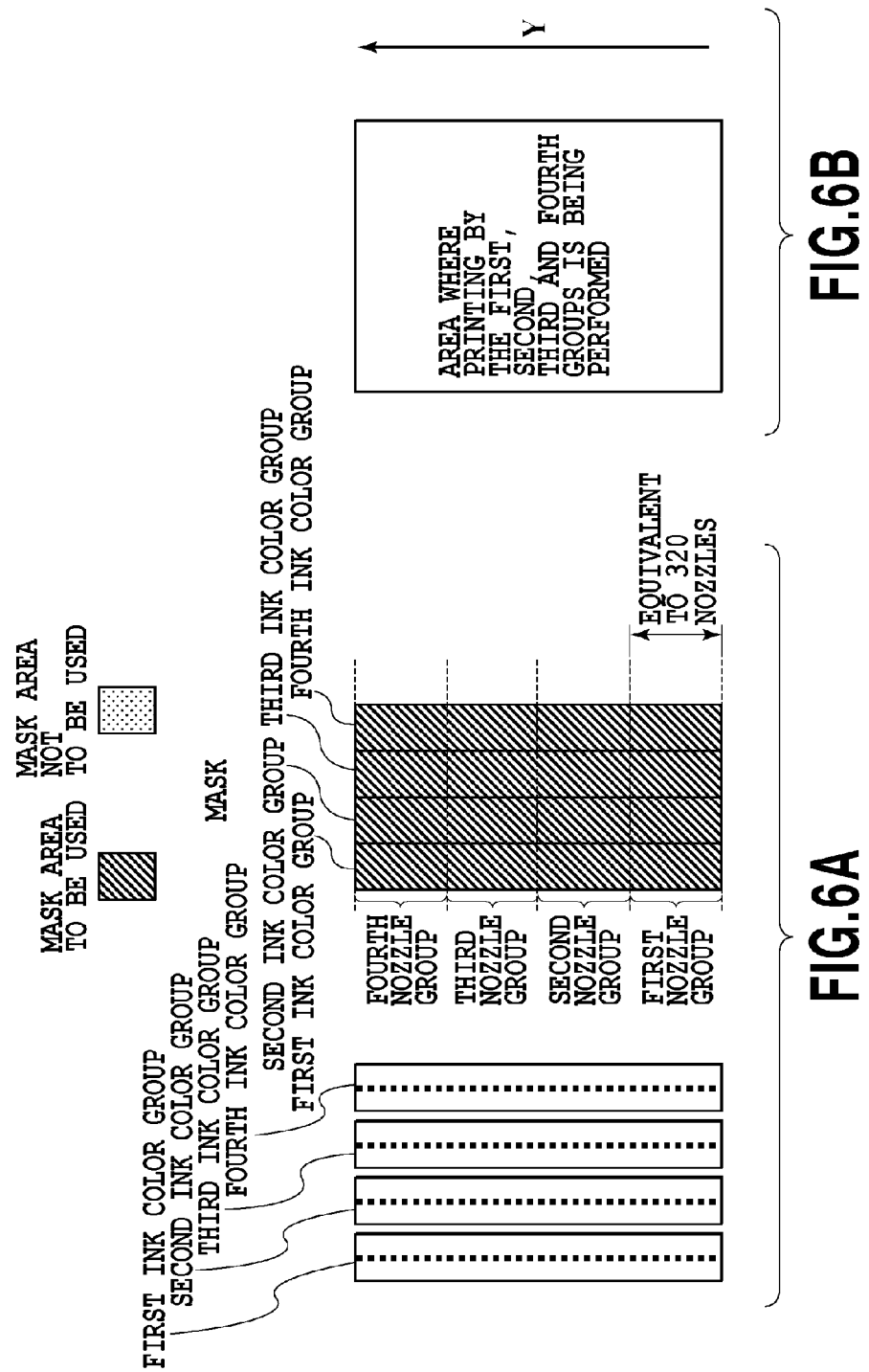

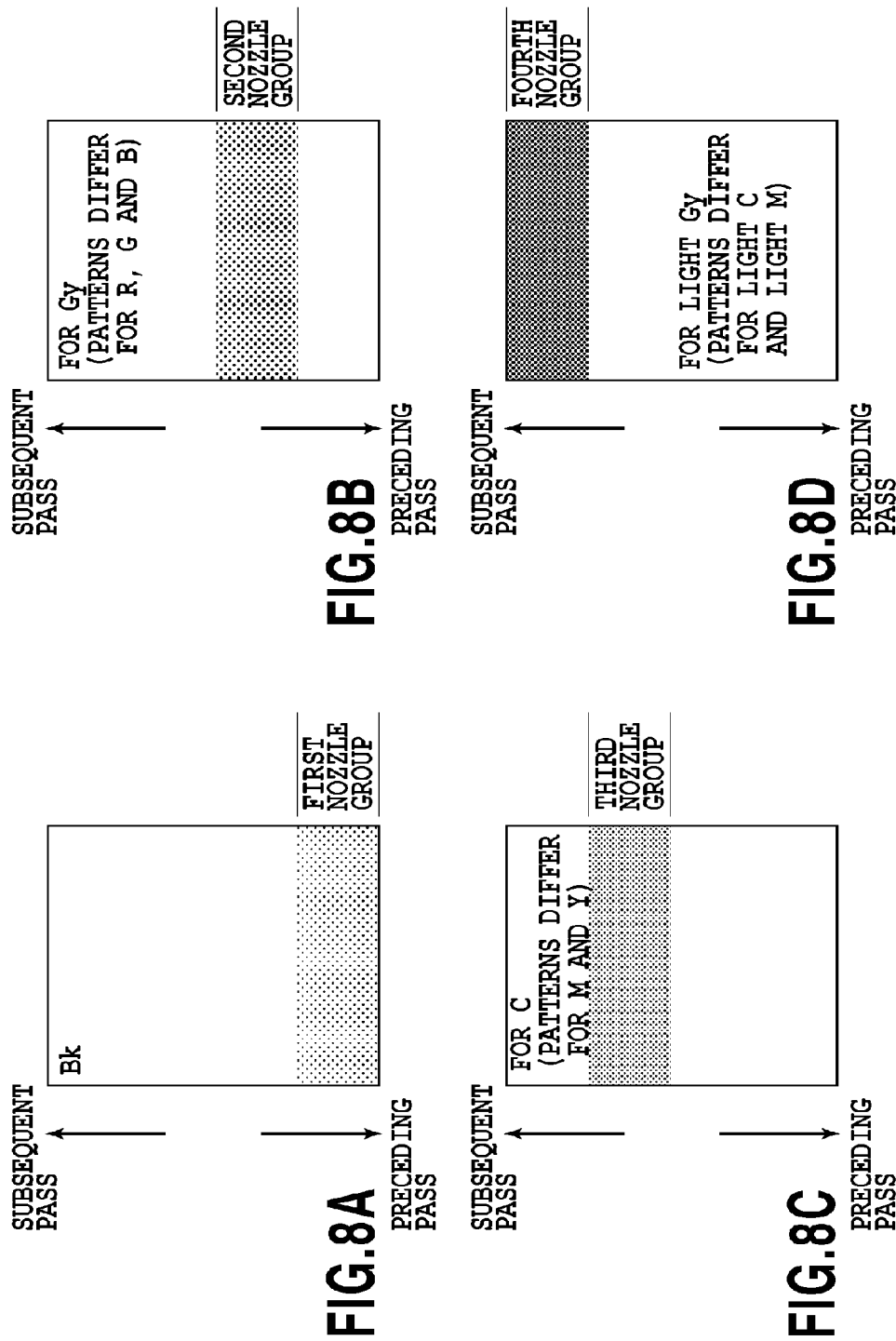

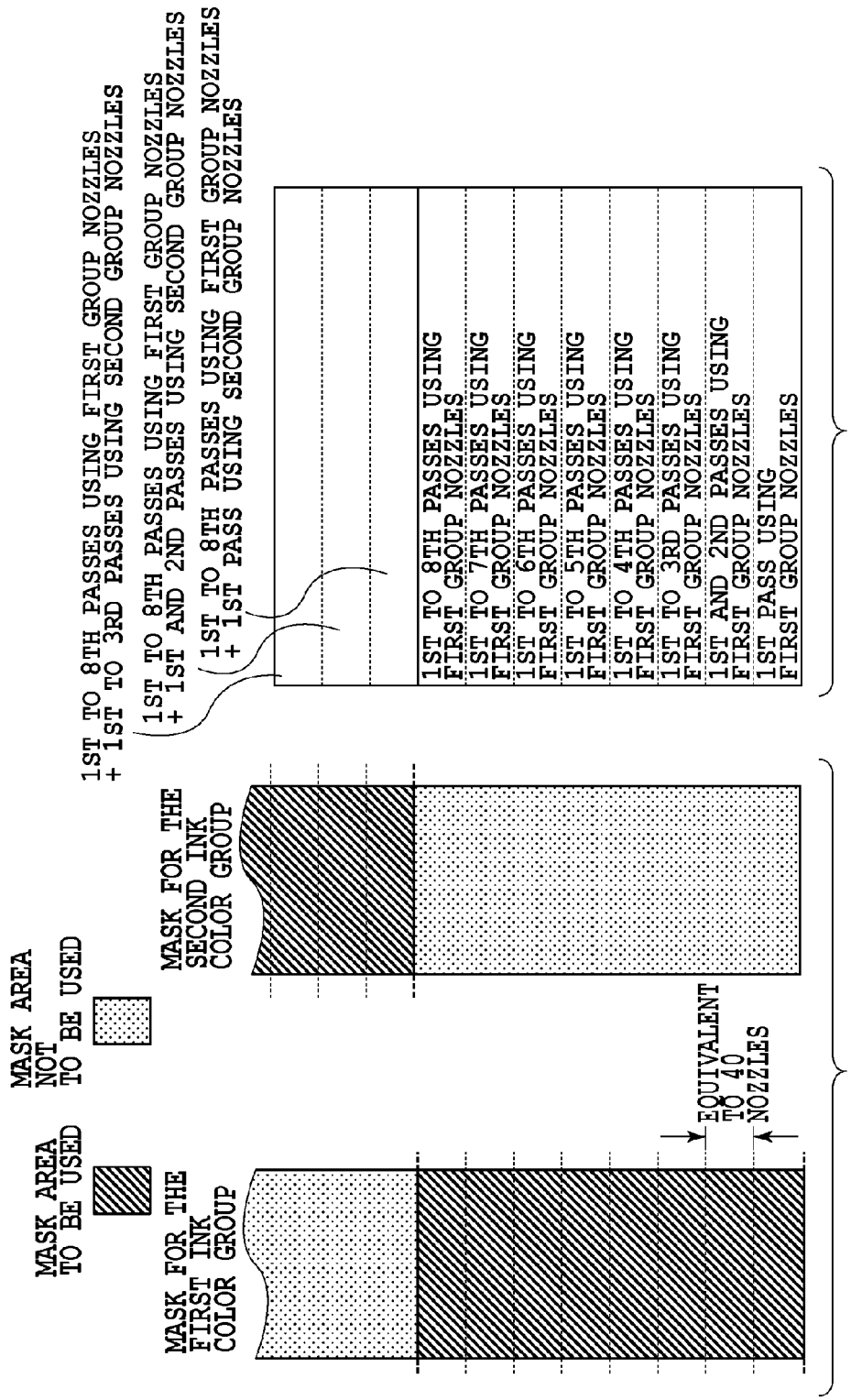

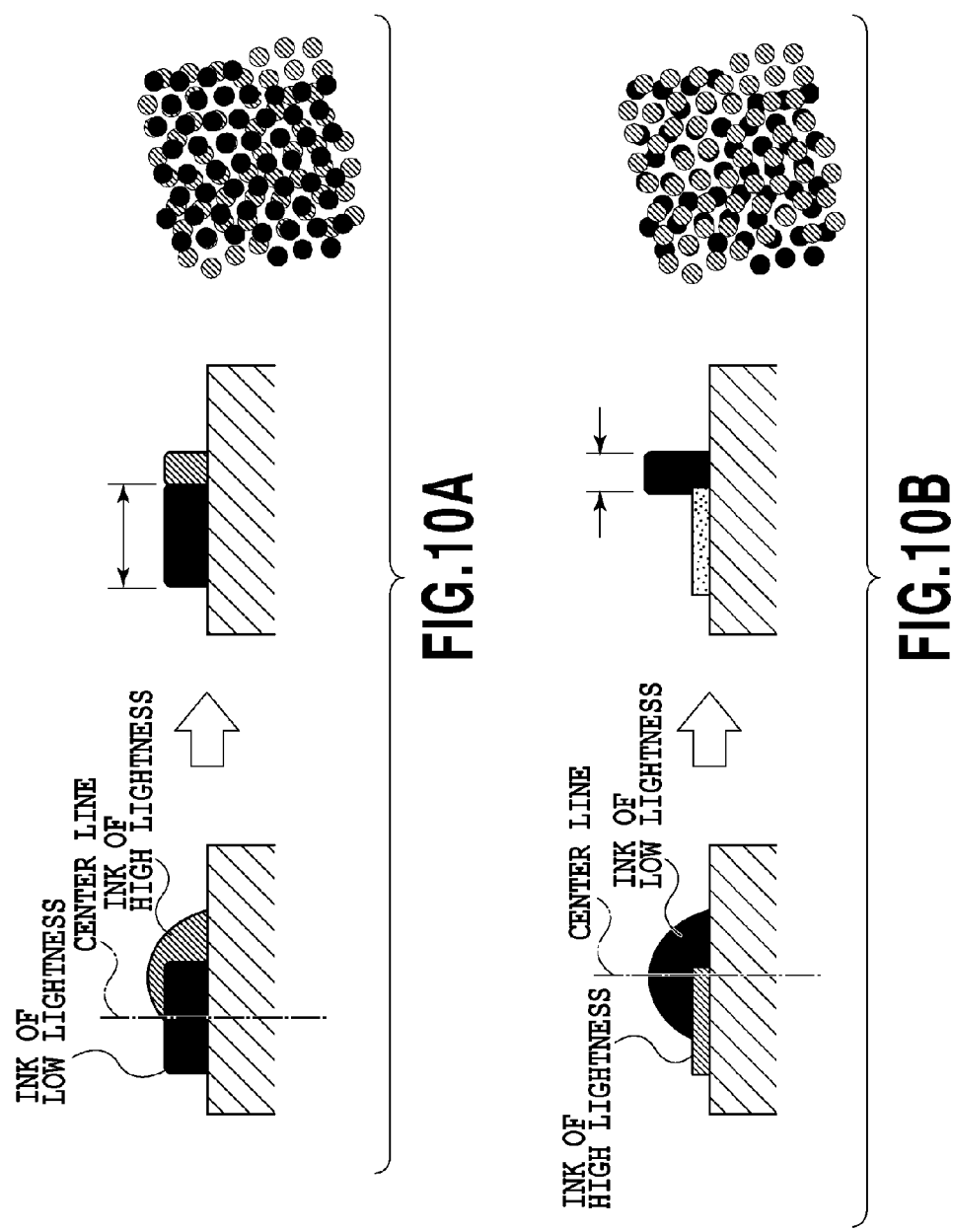

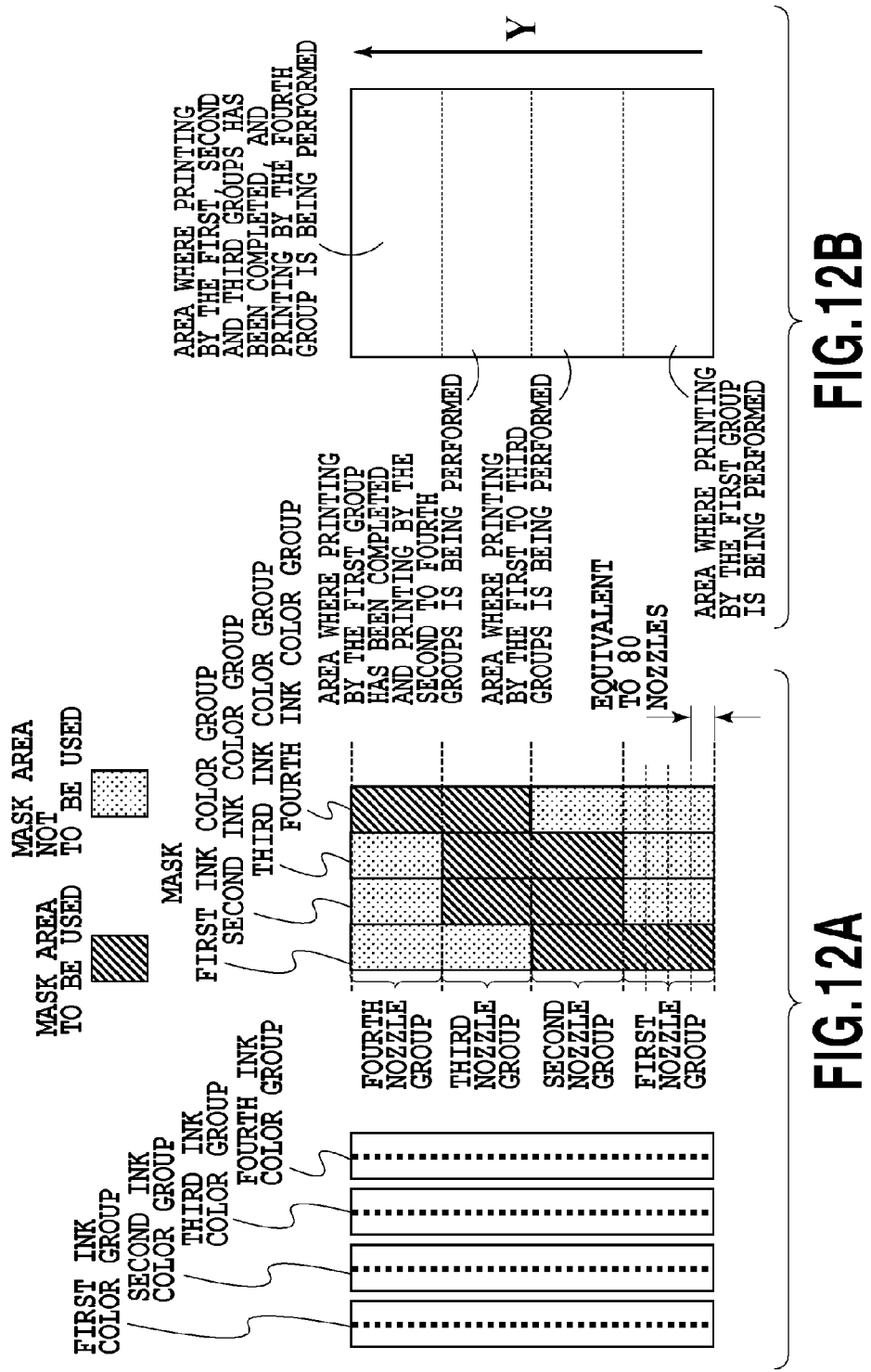

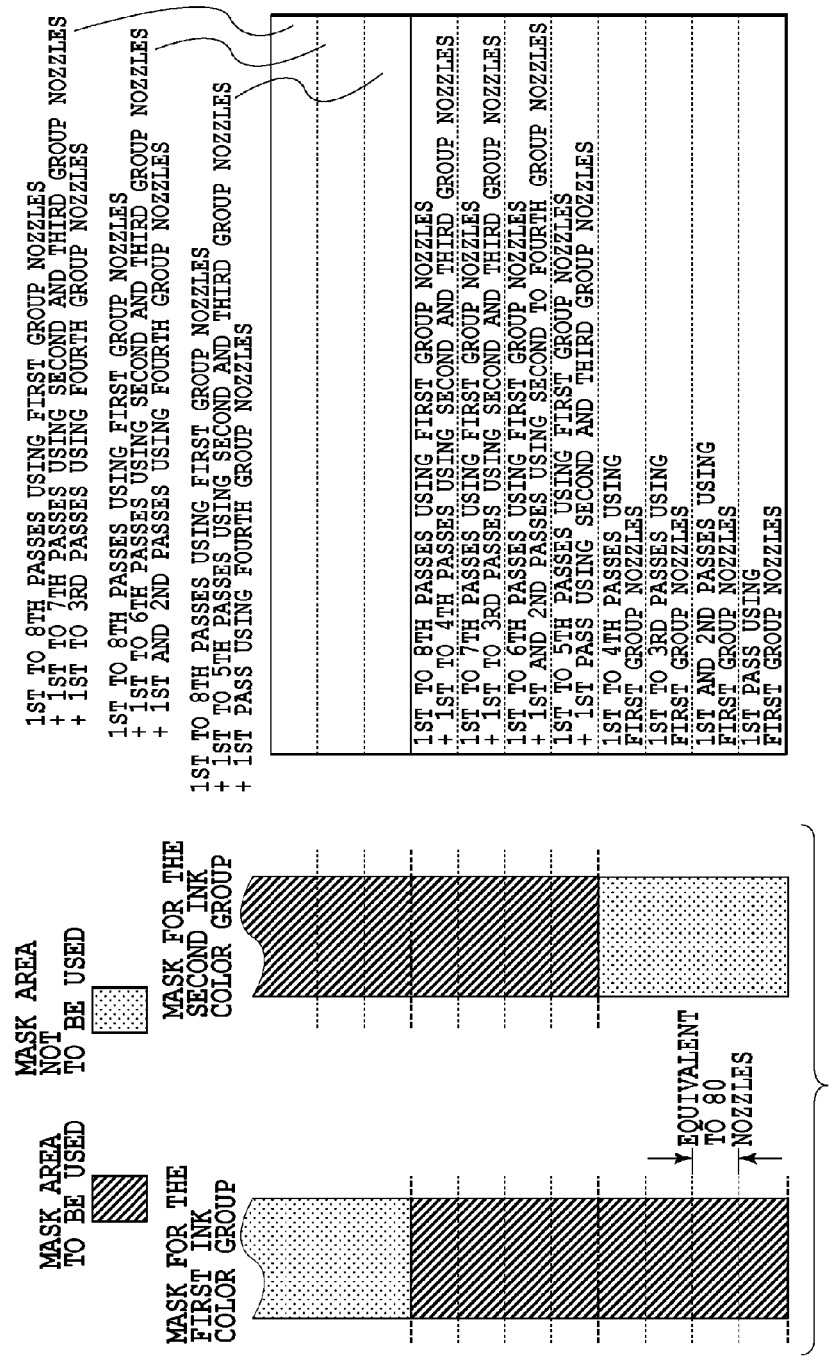

| 4-PASS MODE | 16-PASS MODE | 32-PASS MODE |
|---|---|---|
| 0 | 204800 | 512000 |

FIG.15A

| 4-PASS MODE | 16-PASS MODE | 32-PASS MODE |
|---|---|---|
| 0 | 0.125 | 0.25 |

FIG.15B

INK JET PRINTING APPARATUS AND INK JET PRINTING METHOD

The present application is a divisional of U.S. application Ser. No. 13/270,707, filed on Oct. 11, 2011, which claims priority to JP 2010-232707, filed Oct. 15, 2010, the entire disclosure of each of which is incorporated by reference herein.

BACKGROUND OF THE INVENTION

1. Field of the Invention

The present invention relates to an ink jet printing apparatus and an ink jet printing method, and more particularly relates to a technology that reduces granularity in a printed image by performing multi-pass printing in which scanning by a print head is performed over the same area of a print medium multiple times to complete printing.

2. Description of the Related Art

In multi-pass printing, since the conveying of a print medium is performed between a plurality of scans to complete printing, ink droplets are applied to the print medium, in each scan, following the elapse of a comparatively long time period that includes time for conveying the print medium. Thus, there is a comparatively extended interval, between the ejection of ink for one scan and the ejection of ink for the next scan, that includes the time required to convey the print medium, and the absorption of ink droplets applied to the print medium can be accelerated.

The multi-pass printing system is useful for the absorption of ink, and rarely causes beading, which is a phenomenon where ink dots, which have not yet been fully absorbed, are coupled together. When the number of scans (hereinafter, also referred to as the number of passes) for completing printing is increased, the amount of ink to be applied during each scan is reduced, and the beading of ink occurs less often.

For example, in Japanese Patent Laid-Open No. 2000-135782, an ink jet printing method is disclosed, according to which different types of print medium having different ink absorption properties are employed for printing, and the number of passes is increased for a print medium having a lower absorption property to reduce the occurrence of beading.

However, inventors of the present invention studied this method and found another granularity problem that deteriorates the quality of an image provided by multi-pass printing. It is known that this new granularity problem is not appropriately resolved merely by increasing the number of passes in multi-pass printing. This problem is especially noticeable in a case wherein ink containing a pigment as a color material is employed for glossy paper.

FIG. 1 is a diagram for explaining a mechanism concerning how this granularity occurs. FIG. 1 shows that an ink droplet previously landed on a print medium 101 to form a colored portion 102, and another ink droplet 103 has landed on a portion of the colored portion 102. In the colored portion 102, as an ink solvent is permeating and is evaporating, a pigment that is an ink color material and solid portions such as soluble polymer having a function for dispersing the pigment, are coagulated and deposited. Since the permeation by ink of a print medium is greatly affected by the capillarity of the pore structure of the print medium, the permeating rate of ink at the colored portion 102 where the print medium is not exposed is sharply reduced as fixing time elapses. Whereas the permeating rate at a non-colored portion 104 is greater than that at the colored portion 102, and therefore, as time elapses, the ink droplet 103, which landed later, more permeates the uncolored portion 104 than the colored portion 102. As a result, deposition of the color material of ink landed later is hard to occur in the colored portion where ink landed first, and the size of an area of fixing ink that landed later is reduced.

Assume that the lightness of the color of ink that lands first is higher than the lightness of the color of the ink that lands later. In this case, because of the above described mechanism, ink that landed later is rarely deposited on a colored portion of an ink having a higher lightness, and thus the color of ink that landed later does not sufficiently appear. As a result, the color of the ink having the higher lightness, which landed first, is preferentially exhibited, and such an area is represented as being whitish and is viewed as a whitish granularity (hereinafter, also referred to as "apparent white patches") throughout the entire printed image, so that image quality is deteriorated.

SUMMARY OF THE INVENTION

An objective of the present invention is to provide an ink jet printing apparatus and an ink jet printing method that enables a reduction in the granularity that is caused by the above described apparent white patches.

In a first aspect of the present invention, there is provided a printing apparatus that performs scans to a print medium by using nozzle arrays for respective inks of a plurality of ink colors, each of which arranges nozzles for ejecting ink, to perform printing, the apparatus comprising: a conveying unit configured to convey the print medium; a control unit configured to perform printing to a unit area on the print medium, which is a unit where printing is to be completed by performing a plurality of scans, by a plurality of scans of the nozzle arrays and a conveyance of the print medium at a predetermined amount corresponding to a width of the unit area, the conveyance being performed by the conveying unit between the plurality of scans of the nozzle arrays; and a data generation unit configured to generate print data so that nozzles of the nozzle array for a first ink color are caused to eject ink to the unit area in a scan previous to a scan in which nozzles of the nozzle array for a second ink color are caused to eject ink to the unit area, in the plurality of scans, wherein print density by the ink of the first ink color is higher than print density by the ink of the second ink color.

In a second aspect of the present invention, there is provided an ink jet printing apparatus that performs a plurality of scans of a print head provided with a plurality of nozzles for respective ink colors, with a print medium being conveyed between the plurality of scans, to perform printing to a unit area of the print medium, which is a unit area where printing is completed by the plurality of scans, the apparatus comprising: a control unit configure to selectively perform a first print mode, in which the scan by the print head to the print medium is performed M times, conveying of the print medium at a first conveyance amount between the M times of scans being performed, to complete the printing to the unit area, and a second print mode, in which the scan by the print head is performed N times, N being greater than M and the conveying of the print medium at a second conveyance amount between the N times of scans being performed, to complete the printing of the unit area; and a printing ratio determination unit configured to determine a printing ratio for each of the nozzles of the print head for each of the plurality of scan, so that the printing ratio is determined independently for the ink colors and with having a relative bias for each ink colors with respect to a nozzle array, wherein the printing ratio determination unit determines the printing ratio so that when the second print mode is selected, the relative bias of the printing ratio for each ink colors with respect to a nozzle array is greater than that when the first print mode is selected.

In a third aspect of the present invention, there is provided a printing method of performing scans to a print medium by using nozzle arrays for respective inks of a plurality of ink colors, each of which arranges nozzles for ejecting ink, to perform printing, the method comprising: a conveying step of conveying the print medium; a control step of performing printing to a unit area on the print medium, which is a unit where printing is to be completed by performing a plurality of scans, by a plurality of scans of the nozzle arrays and a conveyance of the print medium at a predetermined amount corresponding to a width of the unit area, the conveyance being performed by the conveying unit between the plurality of scans of the nozzle arrays; and a data generation step of generating print data so that nozzles of the nozzle array for a first ink color are caused to eject ink to the unit area in a scan previous to a scan in which nozzles of the nozzle array for a second ink color are caused to eject ink to the unit area, in the plurality of scans, wherein print density by the ink of the first ink color is higher than print density by the ink of the second ink color.

According to the above described arrangement, the granularity due to the apparent white patches can be reduced.

Further features of the present invention will become apparent from the following description of exemplary embodiments (with reference to the attached drawings).

BRIEF DESCRIPTION OF THE DRAWINGS

FIGS. 6A and 6B are diagrams for explaining a multi-pass printing operation using four passes in a small pass mode according to this embodiment;

FIGS. 8A to 8D are diagrams illustrating example color masks, each of which, respectively, represents one ink color for first to fourth ink color groups;

FIGS. 9A and 9B are diagrams for explaining in detail, the multi-pass printing operation in the large pass mode according to the first embodiment;

FIG. 10A is a diagram for explaining a reduction in apparent white patches, and FIG. 10B is a diagram showing an example for this comparison;

FIGS. 12A and 12B are diagrams for explaining a multi-pass printing operation using 16 passes in a large pass mode according to a second embodiment of the present invention;

FIGS. 13A and 13B are diagrams for explaining in detail the multi-pass printing operation in the large pass mode according to the second embodiment;

FIG. 15A is a diagram showing a dispersion of the center of gravity for the printing ratios in the cases for 4 passes, 16 passes and 32 passes of the print head described for the first and second embodiments, and FIG. 15B is a diagram showing the square sums in the cases for 4 passes, 16 passes and 32 passes of the print head described for the first and second embodiments.

DESCRIPTION OF THE EMBODIMENTS

Embodiments of the present invention will now be described with referring to accompanying drawings.

Figure 2:
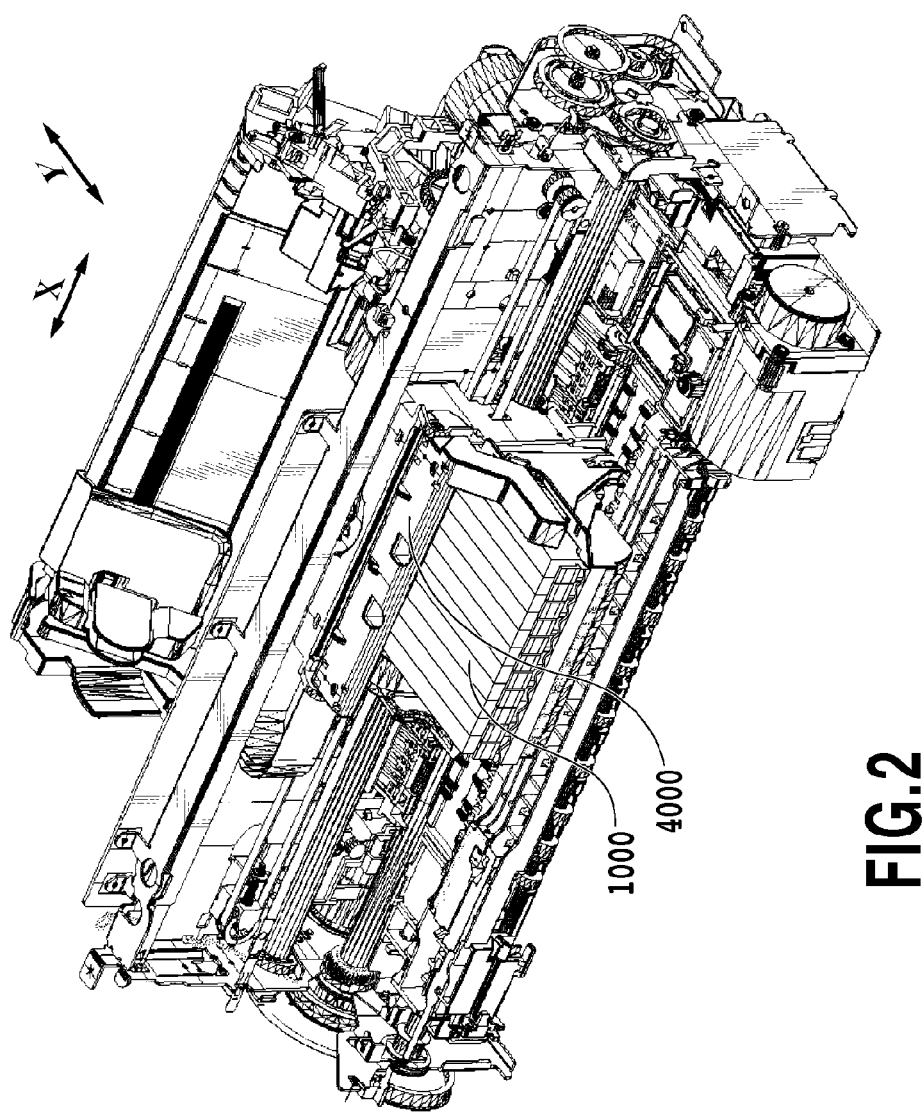
FIG. 2 is a schematic perspective view of the structure of an ink jet printing apparatus according to the present invention.

FIG. 2 is a perspective view of the structure of an ink jet printing apparatus according to an embodiment of the present invention. A carriage 4000 is provided that is movable in two directions (scan directions), indicated by X in FIG. 2, and a print head that includes nozzle arrays, for ejecting eleven colored inks, that will be described later in FIG. 4, and ink tanks 1000, wherein the eleven colored inks are stored, are mounted on the carriage 4000. When the carriage 4000 is moved, scanning to a print medium by the individual nozzle arrays can be performed. A control circuit, which will be described later in FIG. 3, in accordance with image data received from a host apparatus, causes the print head (not shown) to eject ink from the individual nozzles, while the print head mounted on the carriage 4000 is moved in the scan directions. When one scan by the print head has been completed, the print medium is conveyed by a conveying mechanism (not shown), which includes conveying rollers, in a direction Y that intersects the direction X, at an amount corresponding to the number of passes employed for multi-pass printing. When the printing is performed by moving the print head in the scan directions and the conveying of the print medium in the direction Y is repeated, images are sequentially formed on the print medium.

Figure 3:
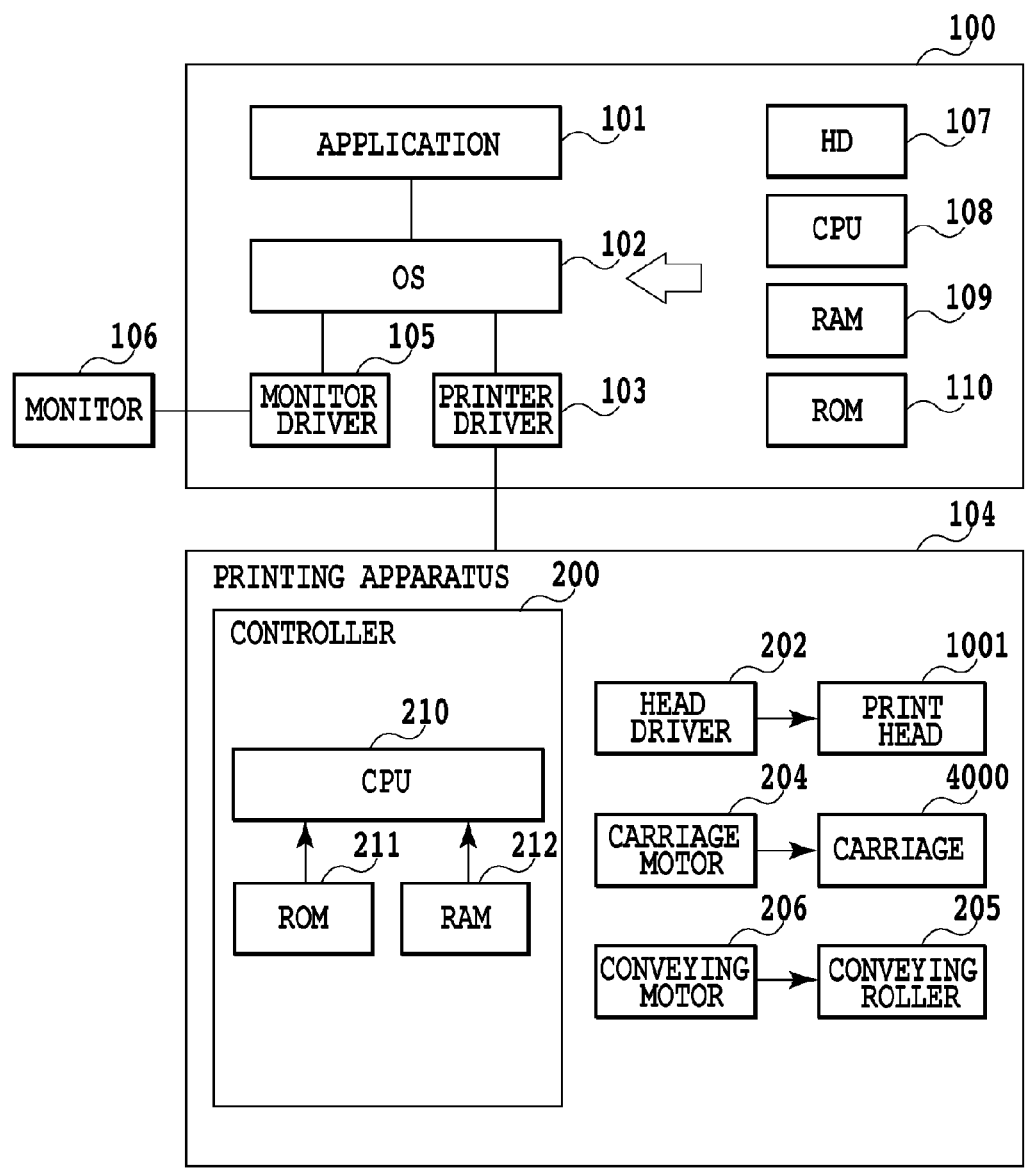
FIG. 3 is a block diagram illustrating the configuration of a printing system provided by an ink jet printing apparatus in FIG. 2, and a host apparatus.

FIG. 3 is a block diagram illustrating the arrangement of a printing system provided by an ink jet printing apparatus 104 shown in FIG. 2 and a host apparatus 100. In FIG. 3, a CPU 108 of the host apparatus 100 employs various programs, stored on a hard disk (HD) 107 and in a ROM 110, to operate application software 101, a printer driver 103 and a monitor driver 105. At this time, a RAM 109 is employed as a work area for performing the individual processes. The monitor driver 105 is software for performing a process for creating image data to be displayed on a monitor 106. The printer driver 103 is software for converting image data, which is to be transmitted by the application software 101 to an OS 102, into multi-valued or binary image data that the printing apparatus 104 can accept, and for transmitting the resultant image data to the printing apparatus 104.

The printing apparatus 104 includes a controller 200, a print head 1001, a head driver 202, the carriage 4000, a carriage motor 204, a conveying roller 205 and a conveying motor 206. The head driver 202 drives the print head 1000 to eject ink through the individual nozzles. The carriage motor 204 is a motor that reciprocally moves the carriage 4000 on which the print head 1001 is mounted. The conveying motor 206 is a motor that drives the conveying roller 205 for conveying a print medium. The controller 200 that controls the entire apparatus 104 includes: a CPU 210, which is a microprocessor; a ROM 211, in which a control program is stored; and a RAM 212, which the CPU 210 uses when processing image data. A control program that controls multi-pass printing in each printing mode, and which will be described later, is stored in the ROM 211. The controller 200 controls the head driver 202, the carriage motor 204 and the conveying motor 206 in order to perform multi-pass printing, and also generates image data, in consonance with each scan of multi-pass printing. More specifically, as will be described later, the controller 200 reads a mask pattern from the ROM 211, in accordance with a printing mode, and employs the mask pattern to generate, for each unit area, image data that is to be printed during each multi-pass printing scan.

A printing method according to one embodiment of the present invention, for the above described ink jet printing apparatus, whereby granularity that occurs due to the apparent white patches can reduced, will now be described.

First Embodiment

In the first embodiment of the present invention, a printing method for reducing granularity that occurs due to beading is performed for a small pass mode, whereby the throughput of multi-pass printing can be increased. Further, a printing method for reducing granularity, which occurs due to the presence of apparent white patches, is performed for a large pass mode, whereby a high image quality can be obtained while the throughput is reduced. Specifically, multi-pass printing of 4 passes is performed in the small pass mode, and multi-pass printing of 32 passes is performed in the large pass mode. In the 32-pass print mode, eleven colored inks are divided into four groups (hereinafter, also referred to as "ink color groups"), and multi-pass printing of 8 passes is performed by using one quarter of the nozzles of each nozzle array, i.e., multi-pass printing of a total of 32 passes is performed.

Figure 4:
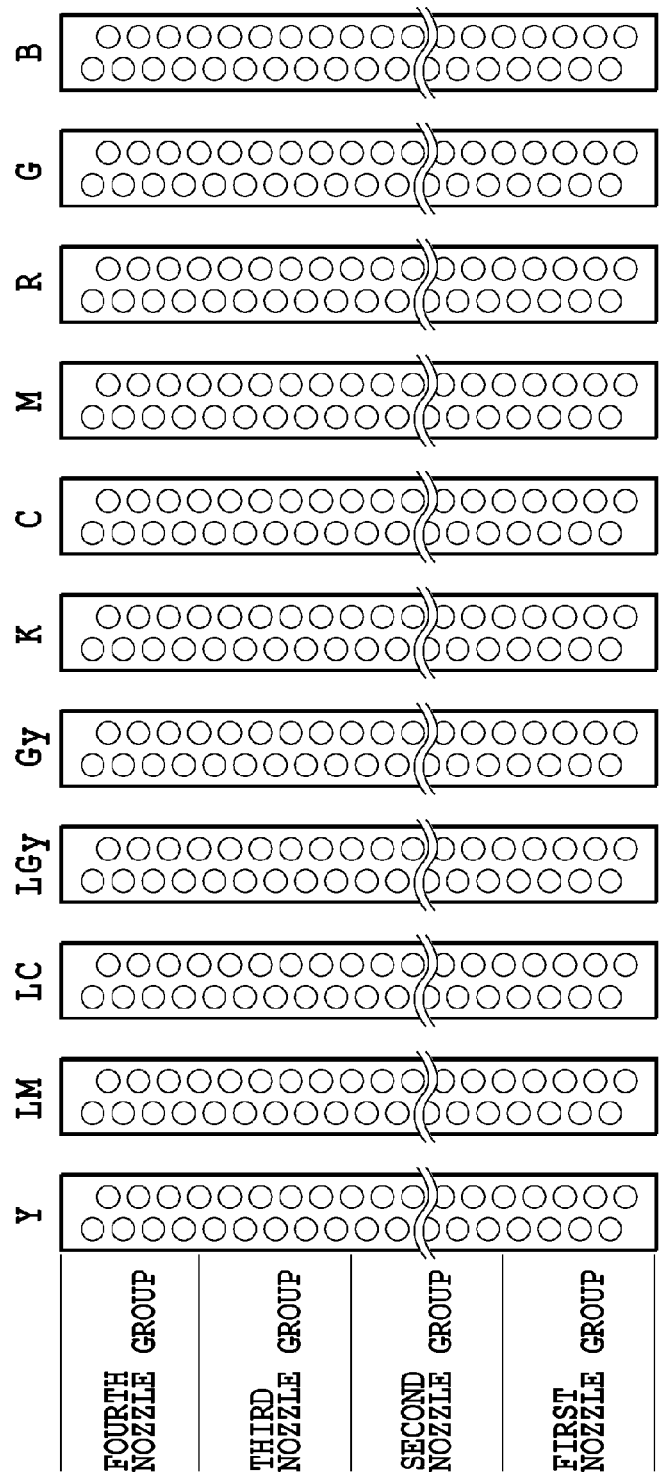
FIG. 4 is a diagram showing a nozzle arrangement for a print head employed for a first embodiment of this invention.

FIG. 4 is a diagram showing nozzle arrays of the print head 1001 employed for this embodiment. The print head 1001 in this embodiment includes nozzle arrays which respectively eject ink of a total of eleven colors, which are ordinary colors of cyan (C), magenta (M), yellow (Y) and black (Bk), light cyan (Lc) and light magenta (Lm) having low-concentration color materials, and red (R), green (G), blue (B), grey (Gy) and light grey (LGy). This embodiment relates to a single print head 1001 that includes the nozzle arrays for ejecting ink in these colors; however, the present invention is not limited to this arrangement. The nozzle arrays that eject these colors of ink may be provided for separate print heads.

When the print head 1001 is mounted on the carriage 4000, the nozzle arrays for the individual ink colors are arranged in the scan directions (in the directions in which the carriage 4000 is moved). The individual nozzle arrays for the ink colors are formed in two columns along a direction (vertical in FIG. 4) perpendicular to the scan directions, and in each column, 640 nozzles are arranged at pitches equivalent to 600 dpi. Further, since the two columns of each nozzle array are positioned by shifting the nozzles half a pitch from each other, it can readily be apprehended that these nozzle arrays are substantially the same as the array of 1280 nozzles vertically aligned at pitches equivalent to 1200 dpi. When the 4-pass printing operation in a small pass mode or the 32-pass printing operation in a large pass mode is to be performed for this embodiment, the above described nozzle arrays for the individual colors are divided into four nozzle groups, from the first to the fourth groups, as shown in FIG. 4.

Figure 5:
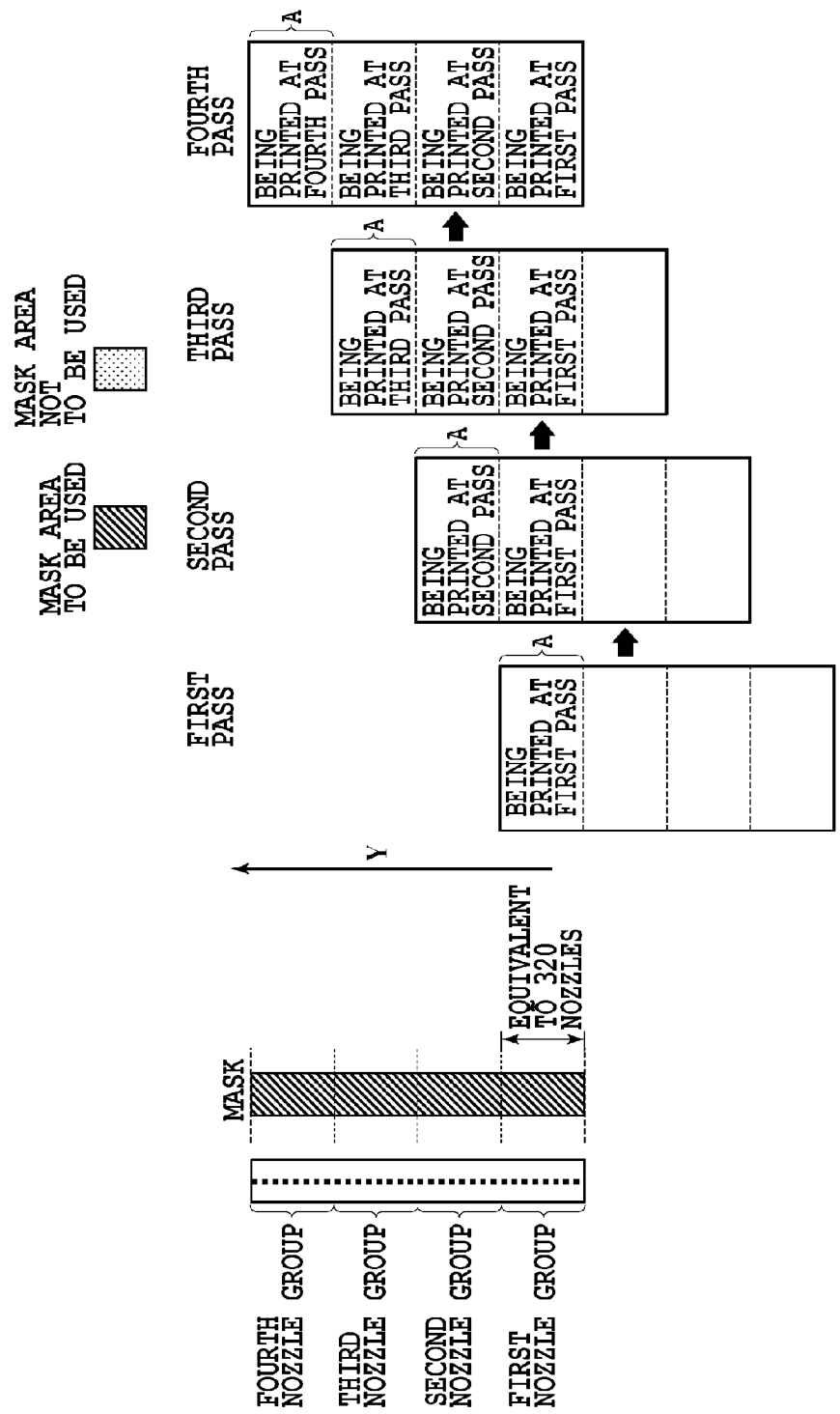
FIG. 5 is a diagram for explaining basic multi-pass printing for which four nozzle groups are employed.

FIG. 5 is a diagram for explaining the basic multi-pass printing performed using the four nozzle groups. As shown in FIG. 5, the nozzles for the individual ink colors are divided into four nozzle groups, from the first to fourth, beginning with the upstream portion in the direction (the direction Y) in which a print medium is to be conveyed. For example, for this embodiment, the nozzle arrays wherein 1280 nozzles are arranged for one color are divided into four nozzle groups, each formed of 320 nozzles.

As shown in FIG. 5, printing for an area A of a print medium is performed by the first scan (first pass) using the first nozzle group, and the print medium is conveyed in the direction Y an amount that corresponds to the width of the area A, i.e., an amount that corresponds to the 320 nozzle pitches, which is the width of a nozzle group. Following this, printing by the second pass for the area A is performed using the second nozzle group. At this time, the first nozzle group is employed to perform printing for the area of the print medium that is adjacent to the area A and has the same width. After the second pass is completed, the print medium is conveyed in the same manner in the direction Y, an amount equivalent to 320 nozzle pitches. The same process is repeated, and at the fourth pass, printing of the area A is completed, while at the fifth pass, the printing of the area adjacent to the area A is completed. In this manner, printing is sequentially completed for each unit area corresponding to a width equivalent to 320 nozzle pitches.

A mask is employed to generate print data that are used for the individual nozzle arrays each time of a pass. The arrangement pattern of mask elements, which determines to permit printing (not mask print data) correspondingly to pixels of print data, is determined in correspondence with the first to fourth nozzle groups. Since the patterns of mask elements for the first to the fourth nozzle groups complement each other, four passes of a print head complete the printing for the unit area corresponding to the width of each nozzle group.

In this embodiment, in the small pass mode, the above described basic multi-pass printing operation is performed for 4 passes with a print medium conveying amount being equivalent to the above described 320 nozzle pitches. On the other hand, in the large pass mode, the multi-pass printing of 32 passes is performed with the print medium conveying amount being equivalent to 40 nozzle pitches and with employing 320 nozzles of each nozzle array for the individual four ink color groups, that correspond to the width of the unit area for the 4-pass printing described above. In this case, for the four ink color groups, Bk ink is allocated to the first ink color group, Gy, R, G and B inks are allocated to the second ink color group, C, M and Y inks are allocated to the third ink color group and light C, light M and light Gy are allocated to the fourth ink color group. The multi-pass printing operations performed in the small pass mode and the large pass mode will now be described in detail.

<Small Pass Mode>

The small pass mode according to this embodiment is a mode by the multi-pass printing of 4 passes. An amount of ink to be applied (hereinafter, referred as also an ejection amount) during one scan becomes equal among 4 scans of the print head. The multi-pass printing operation according to this embodiment is the same as described above with referring to FIG. 5, and a mask employed is a so-called flat mask, having a ratio of 25% in FIG. 5, which is the ratio of mask elements that permit printing, is evenly assigned to mask areas that correspond to the first to the fourth nozzle groups.

FIGS. 6A and 6B are diagrams for explaining the multi-pass printing of 4 passes in the small pass mode according to this embodiment. FIG. 6A shows a relationship between the nozzle arrays of the individual ink color groups and masks and FIG. 6B shows a printing state in one scan to a specific area of a print medium, by using the ink color groups that are used for the one scan.

As shown in FIG. 6A, in the present mode, printing of the respective ink colors of the first to fourth ink color groups is completed by sequentially using the first to fourth nozzle groups of respective ink colors in four scans to the unit area having the width equivalent to 320 nozzle pitches of the nozzle array. In accordance with this mask structure, as shown in FIG. 6B, when a specific print area on the print medium is scanned one time, the entire print area is printed using the nozzle arrays that correspond to the first, second, third and fourth ink color groups.

At this time, as described above, a mask that includes mask areas for which the ratio of the mask elements that permit the printing is 25%, corresponds to the first to the fourth nozzle groups of each of nozzle arrays of the first to the fourth ink color groups. As a result, the ejection amount of ink during one scan can be reduced, and the occurrence of beading can be suppressed.

As described above, when the flat mask is employed for the multi-pass printing of 4 passes, ¼ of the entire ejection amount of ink is ejected during each scan. Assuming that the ink ejection ratio is changed for each scan, when a smaller ejection amount of ink is set for one scan, a larger ejection amount of ink is set for another scan, because the total ejection amount is constant. Therefore, instead of setting for scans an extremely small or large ejection amount of ink, a mask that provides for an equal ejection amount of ink is employed, as in this embodiment. As a result, beading that might occur during the individual scans can be reduced.

<Large Pass Mode>

Figures 7A, 7B:
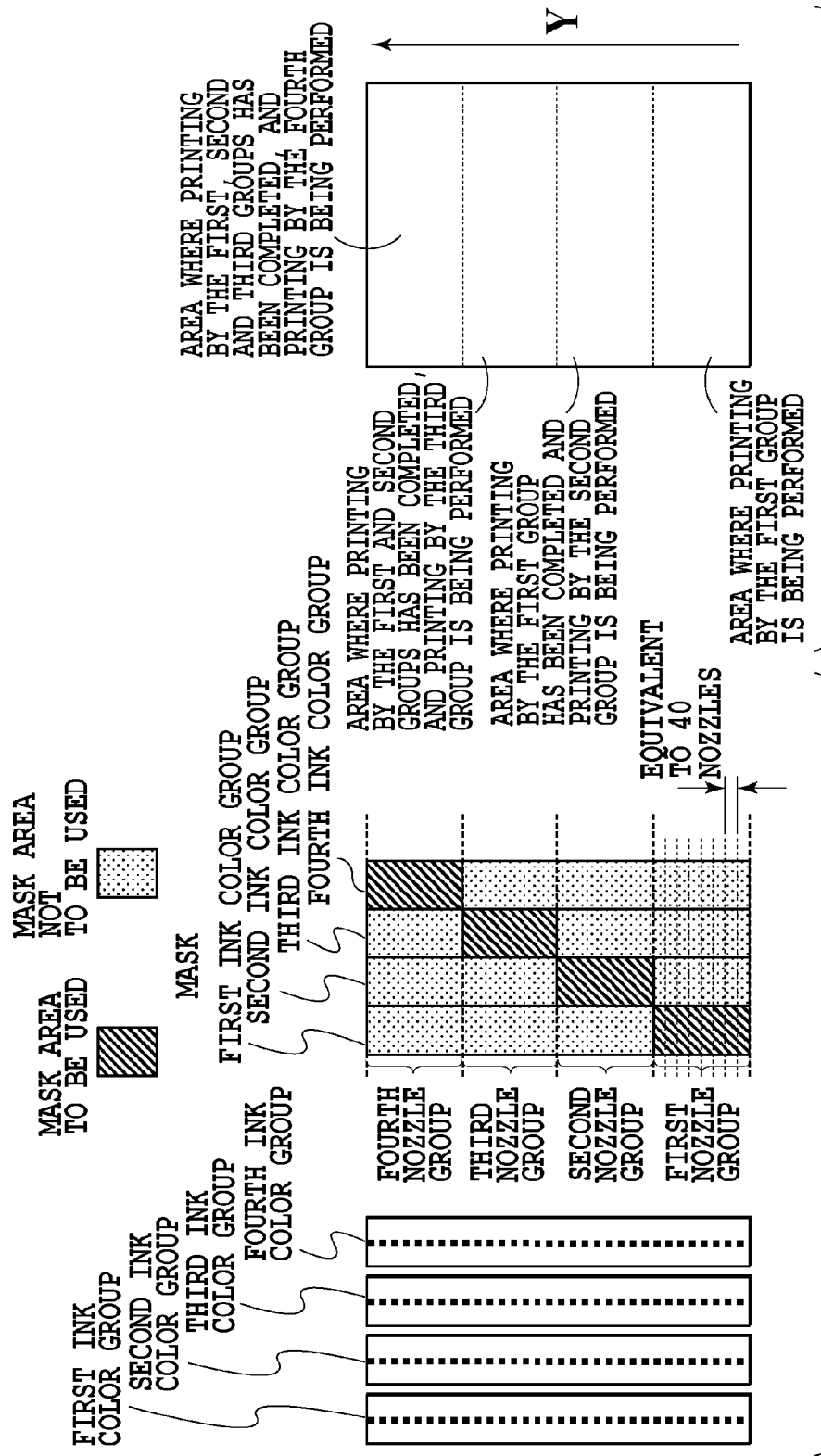
FIGS. 7A and 7B are diagrams for explaining a multi-pass printing operation using 32 passes in a large pass mode according to this embodiment.

FIGS. 7A and 7B are diagrams, being similar diagrams to FIGS. 6A and 6B, for explaining the multi-pass printing operation of 32 passes in the large pass mode according to this embodiment. FIG. 7A shows a relationship of nozzle arrays for individual ink color groups and masks and FIG. 7B shows the state of a specific area of a print medium that has been printed during a single scan, by using the ink color groups.

As shown in FIG. 7A, in the nozzle array of Bk ink that makes a nozzle array of the first ink color group, only the first nozzle group is used and the other nozzle groups are not employed. Accordingly, only a mask area corresponding to the first nozzle group is used in a mask for the first ink color group. Similarly, in the nozzle arrays of Gy, R, G and B inks that make the second ink color group, only the second nozzle groups are used and the other nozzle groups are not used. Accordingly, only mask areas corresponding to the second nozzle groups are used in a mask for the second ink color group. Further, in the nozzle arrays for C, M and Y inks that make the third ink color group, only the third ink nozzle groups are used and the other nozzle groups are not used. Accordingly, only mask areas corresponding to the third nozzle groups are used in a mask for the third ink color group. In the nozzle arrays for light C, light M and light Gy inks that make the fourth ink color group, only the fourth nozzle groups are used and the other nozzle groups are not employed. Accordingly, only mask areas that correspond to the fourth nozzle groups are used in a mask for the fourth ink color group. When scanning for a print area of a print medium is performed one time, four portions shown in FIG. 7B are obtained according to the above mask usage, i.e., the portion that is being printed by using the first nozzle group in the nozzle array of the first ink color group, the portion that has been printed by using the nozzle array of the first ink color group and is being printed by using the second nozzle group in the nozzle array of the second ink color group, the portion that has been printed by the nozzle arrays of the first and second ink color groups and is being printed by using the third nozzle group in the nozzle array of the third ink color group, and the portion that has been printed by using the nozzle arrays of the first, second and third ink color groups and is being printed by using the fourth nozzle group in the nozzle array of the fourth ink color group.

FIGS. 8A to 8D are diagrams showing an example mask employed for one of the ink colors associated with the first to fourth ink color groups.

Each of the four mask areas described above, which are used correspondingly to the first to fourth ink color groups, is divided into eight sub-mask areas, wherein mask elements that permit the printing are arranged to be complement to each other between eight sub-mask areas. Each of the sub-mask areas has a width corresponding to 40 nozzles. Therefore, for each scan performed by a print head, a print medium is conveyed an amount equivalent to 40 nozzle pitches, and eight scans allow printing of the unit area having the width corresponding to 40 nozzle pitches to be completed for each ink color associated with the individual ink color groups. Further, in accordance with the conveyance of the print medium, the ink color used for printing is sequentially varied from the first ink color group to the fourth ink color group, and by performing 32 scans, printing of ink colors associated with the first to fourth ink color groups, i.e., the printing of an image to be printed, is completed.

FIGS. 9A and 9B are detailed diagrams for explaining the multi-pass printing operation in the large pass mode, described above with referring to FIGS. 7A and 7B. FIG. 9A shows a part of the masks for the first and second ink color groups, and FIG. 9B shows the process during which printing is sequentially performed for the unit area having a width equivalent to 40 nozzle pitches, in correlation with the mask areas. As shown in FIG. 9B, to a unit area of a print medium, which has a width corresponding to 40 nozzle pitches, in a first pass, the 1st to 40th nozzles, beginning at the nozzle at the end in the direction in which a print medium is to be conveyed (the direction Y), in the first nozzle group in the Bk ink nozzle array for the first ink color group, are used to perform printing. After this scanning, the print medium is conveyed an amount equivalent to 40 nozzle pitches. In a second pass, the 41st to 80th nozzles of the first nozzle group, beginning at the nozzle at the end described above, in the first nozzle group of the Bk ink nozzle array for the first ink color group, are used to perform printing to the unit area. At this time, to this unit area, printing has been performed by the first pass and the second pass. Thereafter, the conveying of the print medium an amount of 40 nozzle pitches and the scanning by the print head are repeated, and in the eighth pass, to the unit area, the 281st to 320th nozzles of the first nozzle group, beginning with the nozzle at the above described end, in the first nozzle group of the Bk ink nozzle array for the first ink color group, are used to perform printing. At this time, printing of this unit area has been performed by the first to eighth passes. In other words, by using the mask prepared for the first ink color group, printing with the Bk ink associated with the first ink color group has been completed by eight passes.

When printing for the first ink color group has been performed, the print medium is conveyed an amount equivalent to 40 nozzle pitches. Then, in the next ninth pass, the 1st to 40th nozzles, beginning with the nozzle at the upstream end in the direction in which a print medium is to be conveyed, in the second nozzle group of the nozzle arrays for the Gy, R, G and B inks that belong to the second ink color group, are used to perform printing the unit area for which printing of the first ink color group has been completed. At this time, printing for this unit area has been performed by the first to eighth passes associated with the first ink color group and the first pass associated with the second ink group (nine passes in total). Thereafter, the conveying of the print medium an amount equivalent to 40 nozzle pitches and the scanning by the print head are repeated similarly and the printing for the second ink color group is completed at the 16th pass (eighth pass associated with the second ink color group).

According to the large pass mode of this embodiment described above, the nozzle groups that are shifted relative to each other in the direction in which the print medium is conveyed are used for ejecting ink colors associated with the individual ink color groups. That is, printing with ink colors that correspond to different nozzle groups are not performed during the same pass. Specifically, after to the unit area, printing for ink color associated with the first ink color group that uses the first nozzle group has been completed, printing of ink colors associated with the second ink color group that uses the second nozzle group is started. Further, after printing of ink colors that belong to the second nozzle group has been completed, printing of ink colors associated with the third ink color group that uses the third nozzle group is started, and after printing of ink colors that belong to the third nozzle group has been completed, printing of ink colors associated with the fourth ink color group that uses the fourth nozzle group is started. Then, printing for the ink colors associated with the fourth ink color group is completed, and the printing of all the colors is terminated.

As described above, in the multi-pass printing operation in this mode, printing by Bk ink having low lightness ("dark" or "high print density") that belongs to the first ink color group is performed. Then, in different scans, printing by Gy, R, G and B inks having higher lightness that belong to the second ink color group are performed. Further, in the respective different scans, printing by C, M and Y inks that belong to the third ink color group are performed in the same manner, and thereafter, printing by the light C, light M and light Gy inks that belong to the fourth ink color group are performed. As a result, dark ink (ink having a low lightness) is ejected first for coloring, the occurrence of apparent white patches described above can be reduced.

Figure 1:
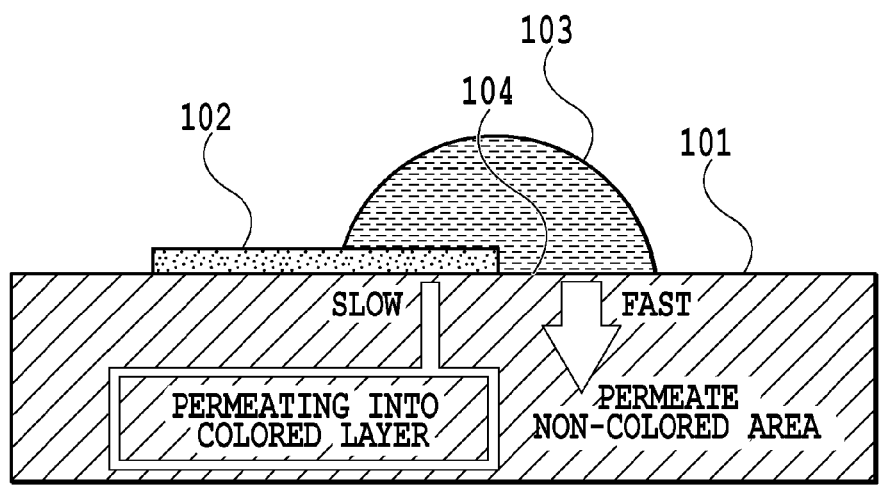
FIG. 1 is a diagram for explaining the mechanism for the occurrence of granularity due to apparent white patches.

FIG. 10A is a diagram for explaining a reduction in these apparent white patches, and FIG. 10B is a diagram showing a comparison example. The comparison example shown in FIG. 10B illustrates an example in which droplets of inks having high lightness (for example, light Gy ink) land first during a prior scan, and droplets of ink having a lower lightness than the prior landed ink (for example, Bk ink) land during a later scan. In this case, because of the fixing property explained with reference to FIG. 1, Bk ink droplets that land during the later scan, are only sparsely deposited on the colored portions where the light Gy ink dots landed during the prior scan, and thus the color of Bk ink is not appropriately exhibited. As a result, the color of the ink having the higher lightness, which lands first, is exhibited preferentially, and the portions of the ink having the higher lightness appear whitish, and are observed as whitish granularity throughout the image. In contrast, in the case of this embodiment shown in FIG. 10A, ink having a low lightness (for example Bk ink) lands in the prior scan, and ink having a higher lightness (for example light Gy ink) lands in the later scan. As a result, the color of Bk ink, which has a low lightness, is preferentially exhibited, an image having a high density image can be obtained as originally intended, and the occurrence of apparent white patches can be reduced.

Figure 11A:
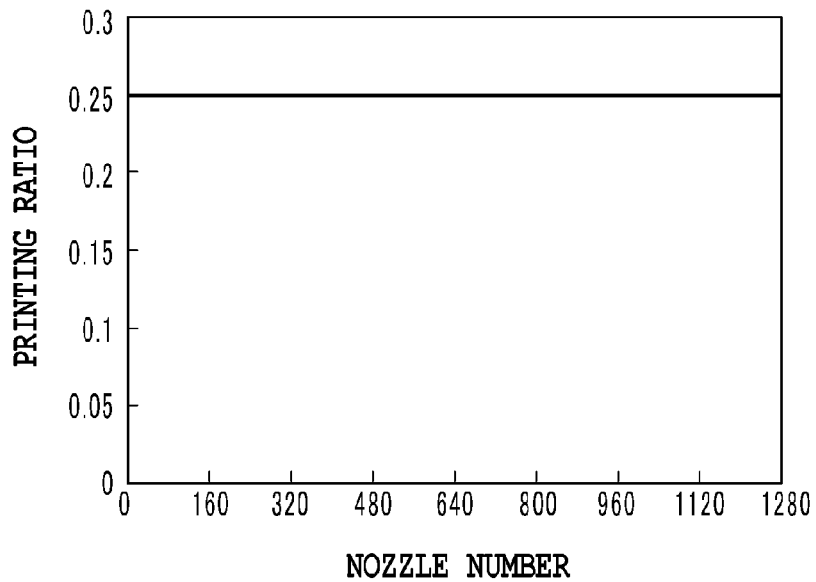
FIGS. 11A and 11B are graphs showing a printing ratio for a mask that is employed for the multi-pass printing operations in the small pass mode and the large pass mode described above.
Figure 11B:
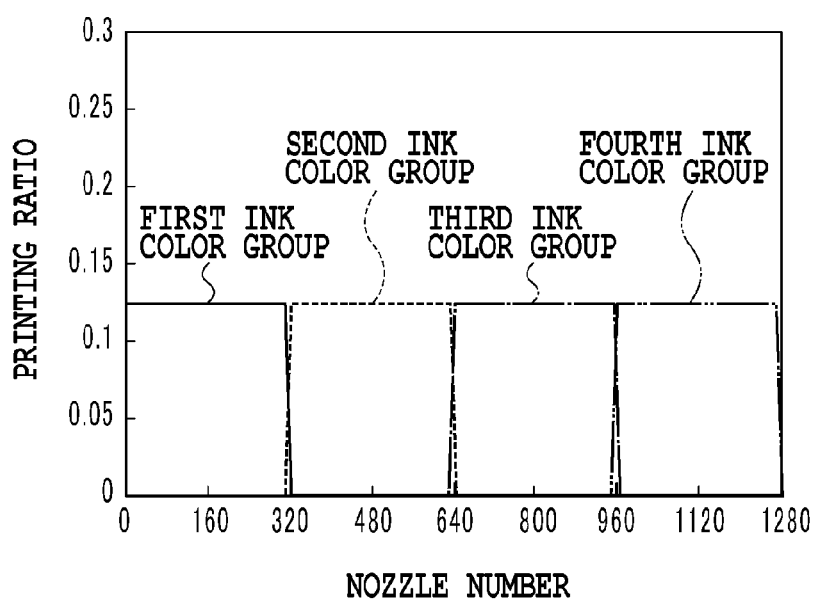

FIGS. 11A and 11B are graphs showing printing ratios for respective masks that are employed for the multi-pass printing operations in the small pass mode and in the large pass mode described above. In these graphs, the horizontal axis represents a nozzle number, and the vertical axis represents a printing ratio for each nozzle employed when a solid image was printed. That is, in this case, the "printing ratio" for a mask represents a ratio of mask elements that permit printing relative to the entire mask.

As described above, a flat mask is employed for a 4-pass printing operation in the small pass mode. Therefore, as shown in FIG. 11A, a printing ratio of 25% is employed for the nozzles for all of the ink color groups. On the other hand, in a 32-pass printing operation in the large pass mode, as shown in FIG. 11B, the first ink color group has the printing ratio of 12.5% for the 1st to 320th nozzles that correspond to the first nozzle group and has 0% for the 321st to 1280th nozzles. Further, the second ink color group has the printing ratio of 12.5% for the 321st to 640th nozzles that correspond to the second nozzle group and has 0% for the other nozzles. Likewise, the third ink color group has the printing ratio of 12.5% for the 641st to 960th nozzles that correspond to the third nozzle group and has 0% for the other nozzles, and the fourth ink color group has the printing ratio of 12.5% for the 961st to 1280th nozzles that correspond to the fourth nozzle group and has 0% for the other nozzles.

The first quantitative interpretation for the printing ratio using 32 passes, described above, can be that when the center of gravity of the printing ratios with respect to the nozzles is calculated for each ink color group to obtain dispersion of the printing ratios, a value for dispersion is increased. The second quantitative interpretation is that the sum of squares of a difference in the printing ratios for the nozzles is increased, between the two ink color groups. These interpretations will now be described. For simplification of the explanation, the colors for the first to fourth ink color groups are defined as colors A, B, C and D.

First Interpretation: "When the center of gravity of the printing ratios employed for the nozzles is calculated for each ink color group to obtain dispersion for the printing ratios, a value for the dispersion is increased".

For obtaining the center of gravity, the nozzle numbers for the individual nozzles are multiplied by the corresponding printing ratios, and the results are added together (the sum of (the nozzle number x the printing ratio)). Then, the sum is divided by the sum of the printing ratios for the nozzles. When this value is small, it represents that, comparatively, nozzles having low nozzle numbers are frequently used for the ejection of ink. In this case, since the nozzles having low nozzle numbers are used for earlier passes in the multi-pass printing operation, it is assumed that the color printed by the nozzles having low nozzle numbers is to be printed during scanning performed at an earlier time. In contrast, when the obtained value is large, nozzles having high nozzle numbers are comparatively frequently used for ink ejection. In this case, nozzles having high nozzle numbers are used for later scans in the multi-pass printing, and it is assumed that the color printed by the nozzles having high nozzle numbers is to be printed by scanning performed at a later time.

In the 4-pass printing operation for this embodiment, the printing ratio of all the nozzles is set as 0.25 (25%) for all the colors A to D. Therefore, the sum of (the nozzle number x the printing ratio) is 1×0.25+2×0.25+ . . . +1280×0.25=204960. And the total printing ratio for all the nozzles is 0.25×1280=320. Therefore, the center of gravity is 204960÷320=640.5.

Following this, the dispersion (variance value) for the centers of gravity is calculated. The average value of the centers of gravity for the individual ink color groups is employed for this calculation. In this embodiment, the center of gravity is 640.5 for all of the four colors A to D, and therefore, the average value is 640.5. The variance is calculated as a value that represents the dispersion of the centers of gravity for the colors A to D. The variance is the sum of the square of values obtained by subtracting, from the average value, the values of the center of gravity for the individual colors. In the above example, $(640.5-640.5)^2+(640.5-640.5)^2+(640.5-640.5)^2+(640.5-640.5)^2=0$, i.e., a variance of 0 is obtained.

In the case of the 32-pass printing operation of this embodiment, the printing ratio is 0.125 for the nozzle numbers 1 to 320 for color A and is 0 for the nozzle numbers 321 to 1280. Therefore, the sum of (the nozzle number x the printing ratio) is $1\times0.125+2\times0.125+\ldots+320\times0.125=6420$. The total printing ratio is $0.125\times320=40$, and therefore, the center of gravity is $6420\div40=160.5$. As for color B, the printing ratio is 0 for nozzles 1 to 320 and nozzles 641 to 1280, and is 0.125 for nozzles 321 to 640. Therefore, the sum of (the nozzle number x the printing ratio) is $321\times0.125+322\times0.125+\ldots+640\times0.125=19220$. The total the printing ratios is $0.125\times320=40$, and therefore, the center of gravity is $6420\div40=480.5$. When the same calculation is performed for colors C and D, the center of gravity is 800.5 for color C and 1120.5 for color D.

Thereafter, dispersion is calculated based on the centers of gravity. The average value of 160.5, 480.5, 800.5 and 1120.5 is 640.5. Therefore, the variance is $(160.5-480.5)^2+(480.5-480.5)^2+(800.5-480.5)^2+(1120.5-480.5)^2=512000$. This value of 512000 shows an indicator for that the printing ratio is adjusted by performing the multi-printing of 32 passes.

Second Interpretation: "The sum of squares of printing ratio differences for the individual nozzles is increased between the two ink color groups".

When the nozzle group for color A is focused on, a difference in the printing ratios for another color, such as color B, is calculated. In the case of 4-pass printing for this embodiment, the same printing ratio is set for colors A to D, and a difference in printing ratio is 0 for each nozzle. For example, for the first nozzle, a printing ratio is 0.25 for color A, and 0.25 for color B, and a difference for these ink colors is $0.25-0.25=0$. Since this relationship is established for all the nozzles, the total value of the squares of these differences for all the nozzles is 0, and accordingly, the sum of the squares is also 0.

In the case of 32-pass printing for this embodiment, for nozzles 1 to 320, the printing ratio is 0.125 for color A and is 0 for color B. Therefore, a difference for these colors is $0-0.125=-0.125$. The difference $-0.125$ raised to the second power is 0.015625, and when an integration of this difference is performed by a number equivalent to the nozzle count, 5.0 is obtained.

For the nozzles 321 to 641, the printing ratio is 0 for color A, and is 0 for color B. Thus, a difference is $0.125-0=0.125$. 0.125 raised to the second power is 0.15625, and when an integration of this value is performed by a number equivalent to the nozzle count, 5.0 is obtained.

For the remaining nozzles, since the printing ratio difference is 0 for colors A and B, the total value of the differences for these two colors is also 0, and accordingly, the sum of squares is 0.

That is, the sum of squares for all the nozzles is $5.0+5.0=10.0$. When the amount (=one bandwidth) in which the print medium is to be conveyed, this integration value is increased proportionally to the number of nozzles, allocated for one conveyance amount (one bandwidth). For example, between the 4-pass print mode (=the conveyance amount is long) and the 8-pass print mode (=the conveyance amount is short), the integration value is varied, i.e., the integration value for the 4-pass print mode is twice that for the 8-pass print mode. Therefore, in order to cancel this difference, the integration value is divided by the number of nozzles allocated for one conveyance amount. In the case of 32-pass printing, the integration value of 40 is divided by the number of nozzles corresponding to one conveyance amount, i.e., $10.0\div40=0.25$. The sum of squares of the printing ratios for all the nozzles is an indicator used for adjusting the printing ratio, in order to avoid the formation of apparent white patches.

Second Embodiment

A second embodiment of the present invention relates to a multi-pass printing operation that differs from the printing operation in the first embodiment, for which 32 passes are used, and that includes a pass in which nozzle groups located at identical positions in a conveying direction of a print medium are used to perform printing of individual ink color groups. Specifically, in the 32-pass printing operation for the first embodiment, ink colors that correspond to different nozzle groups are not employed for each scan to perform printing to a unit area, which is a unit where the printing is to be completed. However, in this embodiment, scans in which different ink color groups are employed are included in scans to perform printing to the unit area.

FIGS. 12A and 12B are diagrams for explaining a multi-pass printing operation using 16 passes, in a large pass mode, according to the second embodiment of the present invention and corresponding to FIGS. 7A and 7B. FIGS. 13A and 13B are diagrams for explaining the details of the multi-pass printing operation in the large pass mode in the second embodiment, and correspond to FIGS. 9A and 9B in the first embodiment.

As is especially apparent from FIG. 12A and FIGS. 13A and 13B, an area that is a unit area where printing is to be completed has a width equivalent to 80 nozzles. For printing the unit area of a print medium, at the first pass, the 1st to 80th nozzles of the nozzle array, for the first ink color group, that belong to the first nozzle group are used to perform printing. Then, conveyance of the print medium an amount equivalent to 80 nozzle pitches between similarly performed respective scans are performed until the fourth pass has been completed. At the fifth pass, the respective 321st to 400th nozzles of the nozzle arrays that belong to the second nozzle group, not only for the first ink color group but also for the second and third ink color groups, are used for performing printing. Thereafter, the same printing operation is repeated.

As described above, the case in which printing using 16 passes is in the middle, between the 4-pass and 32-pass operations. In order to avoid the occurrence of apparent white patches in printed results when using the first to fourth ink color groups, it is desired that ink ejection for the first to fourth ink color groups be performed during passes that are as different as possible, and that the order in which ink dots land or are fixed, as explained in the first embodiment, be obtained. On the other hand, there is a demand that a printing ratio for the first to fourth ink color groups be set as low as possible in order to reduce the occurrence of beading. Assume that, to reduce the occurrence of beading, the printing ratio for the ink color groups is, for example, 0.125%, which corresponds to the ratio employed for 8-pass printing. For the 16-pass printing, an amount in which a print medium is to be conveyed is equivalent to 80 nozzle pitches, or for the 8-pass printing, is equivalent to 640 nozzle pitches. When the printing ratio of 0.125 is applied for the 16-pass printing, the nozzle array consisting of a total of 1280 nozzles can not be completely separated into nozzle ranges, employed for the first to the fourth ink color groups, in the conveying direction of a print medium, and these segments are to be employed by partially overlapping them. The 1st to 640th nozzles are employed for the first ink color group, the 321st to 960th nozzles are for the second and third ink color groups and the 641st to 1280th nozzles are for the fourth ink color group.

Figure 14:
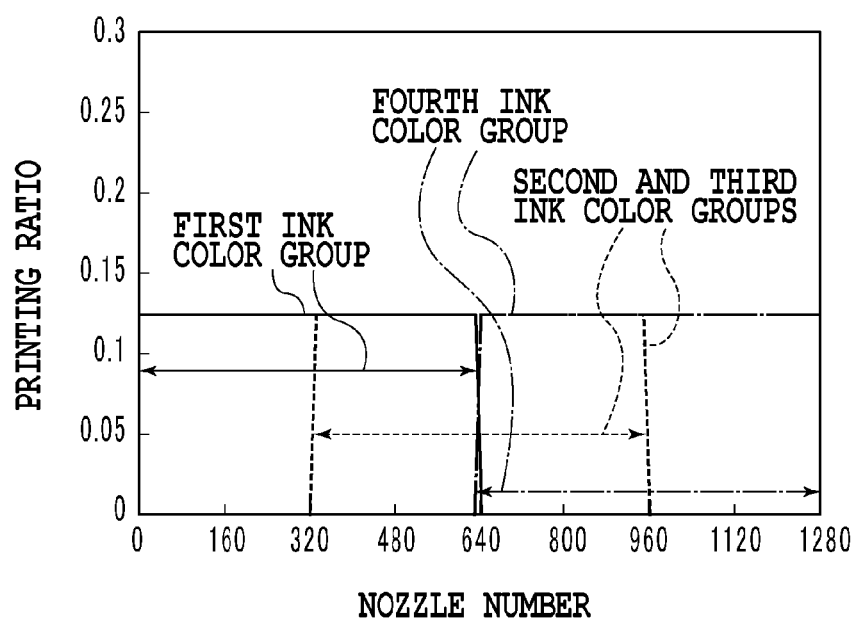
FIG. 14 is a graph showing a printing ratio for the individual nozzles of each ink color group according to the second embodiment.

FIG. 14 is a graph showing the printing ratios for the nozzles for the individual ink color groups according to the embodiment, and corresponding to FIGS. 11A and 11B for the first embodiment.

Based on the distribution of the printing ratios in FIG. 14, dispersion of the center of gravity for the printing ratios for the nozzle arrangement is calculated as follows. The printing ratio for the 1st to 640th nozzles is 0.125 for the first ink color group, and a center of gravity of 320.5 is obtained by performing the same calculation as described above. The printing ratio for the 320th to 960th nozzles is 0.125 for the second and third ink color groups, and a center of gravity of 640.5 is obtained. For the fourth ink color, the printing ratio for the 641st to 1280th nozzles is 0.125, and a center of gravity of 960.5 is obtained. Next, based on the center of gravity, dispersion is calculated. The average value for the centers of gravity, 320.5, 640.5, 640.5 and 960.5 is 640.5. Thus, the dispersion is $(320.5-640.5)^2+(640.5-640.5)^2+(640.5-640.5)^2+(960.5-640.5)^2=204800$. The value 204800 is employed as an indicator for adjusted printing ratios by the 16-pass printing.

Further, the sum of squares of differences in printing ratios is calculated as follows. For the 1st to 320th nozzles, the printing ratio is 0.125 for the first ink color group and is 0 for the second ink color group. Therefore, a difference is $0-0.125=-0.125$. For the 321st to 640th nozzles, the printing ratio is 0.125 for the first ink color group and is 0.125 for the second ink color group. Therefore, the difference is $0.125-0.125=0$. For the 641st to 960th nozzles, the printing ratio is 0 for the first ink color group, and is 0.125 for the second ink color group. Therefore, the difference is $0.125-0=0.125$. For the remaining nozzles, the printing ratio is 0 for the first ink color group, and is 0 for the second ink color group. Thus, the difference is $0-0=0$. The sum of squares is $5.0+0+5.0+0=10$. When this value is divided by a value that corresponds to an amount in which a print medium is to be conveyed, a value $10.0 \div 80=0.125$ is obtained.

FIGS. 15A and 15B are diagrams showing the dispersion for the center of gravity of the printing ratios for the 4-pass, 16-pass and 32-pass printing operation cases described in the first and second embodiments. As described above, these values represent a degree at which the center of the printing ratio is shifted among the ink color groups, and it is obvious that the degree of separation for the nozzle ranges, mutually employed for the ink color groups, is the highest for the 32-pass printing, the lowest for the 4-pass printing, and is intermediate for the 16-pass printing.

FIG. 15B is a diagram showing the sum of squares for the 4-pass, 16-pass and 32-pass printing cases, described above for the first and second embodiments. These values also indicate the degree of separation when the printing ratio is shifted for the ink color groups. It is apparent that the degree of separation of the nozzle ranges, mutually employed for the ink color groups, is the highest for the 32-pass printing, the lowest for the 4-pass printing, and intermediate for the 16-pass printing.

As described above, the embodiments of the present invention relate to the printing apparatus that includes nozzle arrays, formed of nozzles for ejecting ink of the first to fourth ink color groups, and that scans a print medium while moving the nozzle arrays to perform printing. For printing a unit area of a print medium, which is the unit where printing is to be completed by performing a plurality of scans, the printing apparatus moves the nozzle arrays a plurality of times, and conveys, between the movements, a print medium a predetermined amount, which is equivalent to the width of the unit area. Then, to perform a plurality of scans using the nozzle arrays for the first to fourth ink color groups, print data are generated, so that for the nozzle arrays that belong to two arbitrary ink color groups, i.e., the first and second ink color groups, the nozzle array for the first ink color group is employed to eject ink into the unit area prior to the nozzle array for the second ink color group. In this manner, the print color density obtained for the ink is higher for the first ink color group than for the second ink color group.

The embodiments of the present invention also relate to an ink jet printing apparatus wherein a print head that includes a plurality of nozzles for the individual colors is moved a plurality of times, with a print medium being conveyed between the movements, relative to a unit area of a print medium, which is the unit area where printing is completed. Further, the ink jet printing apparatus selectively performs the first print mode, in which the scanning of the unit area of the print medium is performed M times and the conveying of the print medium a first conveyance amount between the scans are performed to complete the printing of the unit area, and the second print mode, in which the scanning of the unit area N times, which is greater than M times, and the conveying of the print medium a second amount are performed to complete the printing of the unit area. In accordance with the selected print mode, the printing ratios for the nozzles of the print head employed for the individual scans are independently set for the ink colors, and are relatively deviated for the individual nozzle arrays for the ink colors. At this time, the printing ratio is set, so that when the second print mode is selected, the relative deviation of the printing ratio of the nozzle array for each ink color is greater than when the first print mode was selected.

Figure 16:
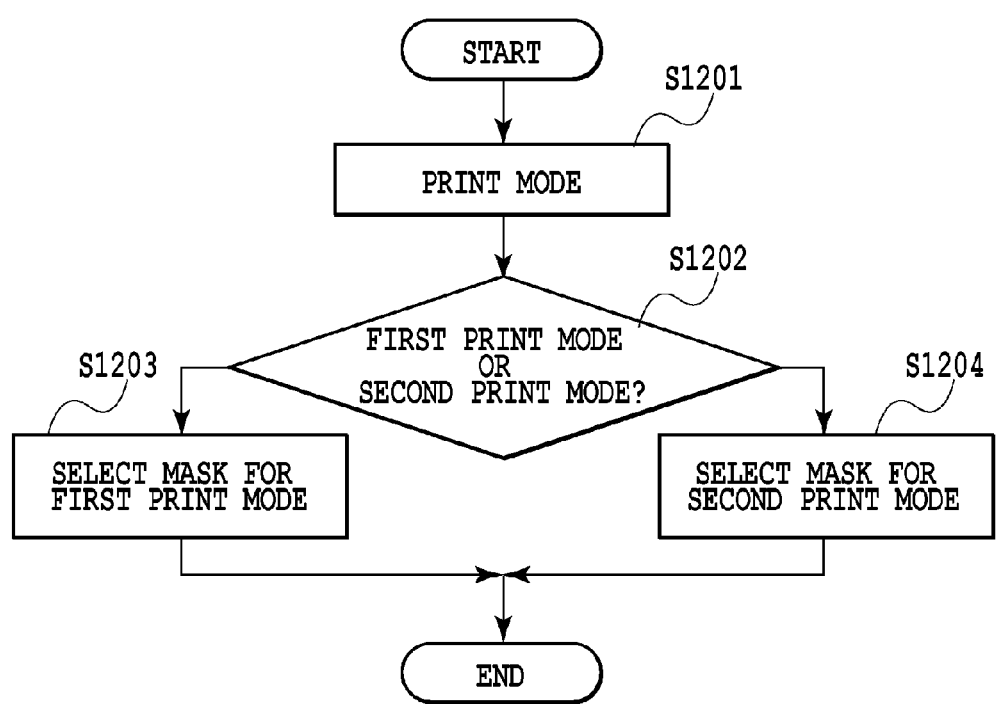
FIG. 16 is a flowchart showing the binary data generation processing performed for the first and second embodiments.

FIG. 16 is a flowchart for the binary data generation processing according to the first and second embodiments.

First, a host apparatus selects one print mode from among a plurality of print modes for which different conveyance amounts and passes are designated (S1201). The selection of a print mode may be performed manually, by a user, or automatically, by the host apparatus in accordance with image data. The selected print mode is set, in the host apparatus, as a print mode employed for printing. Three or more print modes may be employed, but to simplify the following explanation, it is assumed that the selection of two print modes is enabled.

Sequentially, a check is performed to determine whether the print mode that has been set is the first print mode or the second print mode (S1202). The first print mode is a mode in which the 4-pass printing operation described above is performed at the printing ratio shown in FIG. 11A and employs a conveyance amount equivalent to 320 nozzle pitches. On the other hand, the second print mode is a mode in which the 32-pass printing operation is performed at the printing ratio shown in FIG. 11B.

When it is determined at step S1202 that the first print mode has been set, program control advances to step S1203 and a mask pattern to be employed is selected. At this time, a mask pattern is set at the print ratio shown in FIG. 11A.

When it is determined at step S1202 that the second print mode has been set, program control is shifted to step S1204, and a mask pattern to be employed is selected. At this time, the mask pattern is set at the printing ratio shown in FIG. 11B.

As described above, in this process, the printing ratio is changed based on a change in the number of passes. Therefore, the optimal printing ratio can be selected for the mode for reducing the occurrence of beading and the mode for reducing the occurrence of apparent white patches, and granularity can be reduced in the individual modes.

Other Embodiments

For the above embodiments, the 4-pass print mode has been employed as an example first print mode, and the 32-pass print mode has been employed as an example second print mode. However, the number of passes employed for the present invention is not limited to these passes. For example, the first print mode may be a 4-pass print mode, and the second print mode may be a 16-pass print mode. Further, a third print mode may be additionally provided, and a 4-pass print mode as the first print mode, a 16-pass print mode as the second print mode and a 32-pass print mode may be employed as the third print mode. An arbitrary print mode set can be employed so long as the cycle for the generation of binary data is a divisor having a value representing a conveyance amount.

Furthermore, when the first print mode employs M passes and the second print mode employs N passes, which are greater than M passes, the third print mode can be designated as a print mode in which printing is performed for the unit area by scanning performed L times, which is greater than M but less than N. In this case, a relative deviation in the printing ratios of the nozzle arrays for the individual ink colors is increased in the mode order the first print mode, the third print mode and the second print mode.

Moreover, regardless of the print mode, the multi-pass printing operation for the present invention may be performed to reduce the occurrence of white patches.

In the above embodiments, the ink colors employed for printing have been divided into four groups; however, a grouping method for the ink is not limited to this. The ink types or the lightness values or concentration of the inks may be employed to divide inks into groups. Further, a reference for grouping is not limited to the lightness, and saturation may be employed as a reference. In this case, high saturation is called "dark" or "high print density".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-232707, filed Oct. 15, 2010, which is hereby incorporated by reference herein in its entirety.

What is claimed is:

1. A printing method of performing a plurality of scans of a print head provided with a plurality of nozzle arrays for respective ink colors, where each of the plurality of nozzle arrays is formed from a plurality of nozzles for ejecting ink which are arranged in a predetermined direction, the plurality of nozzle arrays being arranged in an intersecting direction that intersects the predetermined direction, with a print medium being conveyed in the predetermined direction between the plurality of scans, to perform printing to a unit area of the print medium, which is a unit area where printing is completed by the plurality of scans in a scan direction that intersects the predetermined direction, said method comprising:

a control step of selectively performing a first print mode, in which the scan by the print head to the print medium is performed M times, conveying of the print medium at a first conveyance amount between the M times of scans being performed, to complete the printing to the unit area, a second print mode, in which the scan by the print head is performed N times, N being greater than M and the conveying of the print medium at a second conveyance amount between the N times of scans being performed, to complete the printing of the unit area, and a third print mode which completes printing to the unit area by L times of scans, L being greater than M but less than N; and a printing ratio determination step of determining a printing permission ratio for each of the nozzles of the print head for each of the plurality of scans, so that the printing permission ratio is determined independently for the ink colors and with having a relative bias for each ink color with respect to a nozzle array according to the performed printing mode, wherein said printing permission ratio determination step determines the printing permission ratio for the printing head so that the printing permission ratios that are determined not to be zero are different between the first mode and the second mode, and the relative bias of the printing permission ratio for each ink color with respect to a nozzle array is increased in an order of the first print mode, the third print mode and the second print mode, and wherein said printing permission ratio determination step determines the printing permission ratio for the printing head so that in the case of performing printing of the second and third print modes, a center of gravity of the printing permission ratio with respect to the nozzle array which ejects a higher print density ink is located at an upper stream in the predetermined direction.

2. The printing method as claimed in claim 1, wherein the relative bias of the printing permission ratio for each ink color with respect to a nozzle array is a variance of a center of gravity of the printing permission ratios with respect to the nozzles, the center of gravity being obtained from the printing permission ratios for each of nozzles for each ink color.

3. The printing method as claimed in claim 1, wherein the relative bias of the printing permission ratio for each ink color with respect to a nozzle array is a value obtained by summing up squares of difference of the printing permission ratios between nozzles of different ink colors for all nozzles.

4. The printing method according to claim 1, wherein the printing permission ratios that are determined not to be zero are the same between the second mode and the third mode.

5. A printing method for performing a plurality of scans of a print head provided with a plurality of nozzle arrays for respective ink colors, where each of the plurality of nozzle arrays is formed from a plurality of nozzles for ejecting ink which are arranged in a predetermined direction, the plurality of nozzle arrays being arranged in an intersecting direction that intersects the predetermined direction, with a print medium being conveyed in the predetermined direction between the plurality of scans, to perform printing to a unit area of the print medium, which is a unit area where printing is completed by the plurality of scans in a scan direction that intersects the predetermined direction, said method comprising:

a control step of selectively performing a first print mode, in which the scan by the print head to the print medium is performed M times, conveying of the print medium at a first conveyance amount between the M times of scans being performed, to complete the printing to the unit area, a second print mode, in which the scan by the print head is performed N times, N being greater than M and the conveying of the print medium at a second conveyance amount smaller than the first conveyance amount between the N times of scans being performed, to complete the printing of the unit area, and a third print mode, in which the scan by the print head is performed L times, L being greater than M and smaller than N and the conveying of the print medium at a third conveyance amount smaller than the first conveyance amount and larger than the second conveyance amount between the L times of scans being performed, to complete the printing of the unit area;

a setting step of setting use ranges in each of the plurality of nozzle arrays based on the print mode performed selectively by said control step, wherein said setting step sets the use range for the nozzle array for a first ink color and the nozzle array for a second ink color, which has a lower print density than the first ink color, of the print head so that when the second print mode is selected, a length of an overlap part of the use ranges in the nozzle arrays for the first ink color and the second ink color in the predetermined direction is shorter than the length when the third print mode is selected, wherein when the third print mode is selected, the length of an overlap part of the use ranges in nozzle arrays for the first ink color and the second ink color is shorter than the length when the first print mode is selected, and wherein said setting step sets the use ranges for the nozzle arrays for the first and second ink color so that in the case of performing printing of the second and third print modes, the use range in the nozzle array for the first ink color is located at an upper stream in the predetermined direction than the use range in the nozzle array for the second ink color.

6. The printing method according to claim 5, wherein the setting step sets the use ranges so that when the second print mode is selected, the use ranges in the nozzle arrays for the first ink color and the second ink color do not overlap.

7. The printing method according to claim 5, wherein a print density of the ink of the first ink color is higher than a print density of the ink of the second ink color.

8. The printing method according to claim 5, wherein the first ink color and the second ink color have the same hue.

9. The printing method according to claim 5, wherein when the third print mode is selected and when the second print mode is selected, the setting step sets the use ranges so that the use ranges of the nozzle arrays for the first ink color are located upstream of the use ranges of the nozzle arrays for the second ink color in the conveyance direction.

* * * * *